United States Patent Office 3,446,848
Patented May 27, 1969

---

3,446,848
MANUFACTURE OF AMINO POLYETHER POLYOLS
Roxburgh Richmond Aitken and Raymond Joseph Marklow, Manchester, England, assignors to Imperial Chemical Industries Limited, London, England, a corporation of Great Britain
No Drawing. Filed May 3, 1966, Ser. No. 547,163
Claims priority, application Great Britain, May 19, 1965, 21,222/65
Int. Cl. C07c *41/02, 85/00, 85/06*
U.S. Cl. 260—584     5 Claims

---

ABSTRACT OF THE DISCLOSURE

A process for the manufacturing of a polyether polyol by reacting an alkylene oxide with a mixture of (a) a hydroxyalkylamine that is liquid 100° C. and contains at least two active hydrogen atoms in the molecule and (b) one of (1) a polyhydric alcohol having a melting point in excess of 100° C., (2) an amine having at least two amino groups and at least three active hydrogen atoms in the molecule, the amino groups being the sole active hydrogen-containing groups and (3) mixtures of (1) and (2).

---

This invention relates to improvements in or relating to the manufacture of polymeric materials and more particularly to the manufacture of polyether polyols and their use in the production of polyurethanes.

It is already known to manufacture polyether polyols by reacting alkylene oxides with compounds containing active hydrogen atoms and to use the products in the manufacture of polyurethanes. The reaction with the alkylene oxide is most conveniently carried out when the compounds containing active hydrogen atoms are polyhydric alcohols which are liquids at the reaction temperature. However, many of the polyhydric alcohols which yield polyether polyols suitable for use in polyurethane manufacture are high melting compounds and special techniques have had to be devised in order to facilitate their oxyalklation. Again when the compound having active hydrogen atoms is an amine free from hydroxyl groups difficulties arise in that unless special catalysts or special techniques are used it is frequently difficult to obtain the degree of reaction with the alkylene oxide which is required. These techniques have minimised some of the difficulties associated with the use of high melting polyhydric alcohols and amines but they have often involved the use of more complicated oxyalkylation processes or the production of polyethers which are unsuitable for use in polyurethane processes because of contamination with undesirable by-products.

The present invention provides a process for the manufacture of a polyether polyol which comprises reacting an alkylene oxide with a mixture of a compound containing active hydrogen atoms which is a polyhydric alcohol having a melting point in excess of 100° C. or an amine having at least three active hydrogen atoms and no hydroxyl groups in the molecule or a mixture thereof and a hydroxyalkylamine that is liquid at 100° C. and contains at least two active hydrogen atoms in the molecule.

The liquid hydroxyalkylamines containing at least two active hydrogen atoms in the molecule are primary, secondary or tertiary amino compounds which contain at least one hydroxyalkyl group attached to an amino nitrogen. Examples of suitable hydroxyalkylamines include those containing only two active hydrogen atoms in the molecule, for example N-methyldiethanolamine but particularly those containing at least three active hydrogen atoms, for example monoethanolamine, diethanolamine, triethanolamine, tetrakis(2-hydroxyethyl)ethylenediamine and tetrakis(2-hydroxypropyl)ethylenediamine. Liquid mixtures of hydroxyalkylamines may be used and, in fact, are of particular importance since commercial hydroxylamines are usually available in the form of mixtures. Suitable liquid mixtures include the commercial grades of ethanolamines, particularly triethanolamine, and mixed isopropanol-amines.

The alkylene oxides which may be used in the process of the present invention include ethylene oxide, propylene oxide and butylene oxide and mixtures thereof. If desired, the alkylene oxide may be incorporated in the reaction mixture in more than one stage, a different oxide being used at each stage. Thus, for example, the mixture of active hydrogen-containing compounds may be reacted first with propylene oxide and then with ethylene oxide.

Polyhydric alcohols having melting points in excess of 100° C. include trimethylolethane, pentaerythritol, methylglucoside, sorbitol, mannitol, dulcitol, dipentaerythritol, sucrose and glucamine, glucosamine and glucosaminol and their N-alkyl derivatives. The process of the present invention is particularly suitable for the oxyalkylation of polyhydric alcohols containing six or more active hydrogen atoms in the molecule to produce polyether polyols which are of considerable value for the manufacture of rigid polyurethane foams. Mixtures of polyhydric alcohols may be used if desired. It will be appreciated that the process is also applicable to polyhydric alcohols having melting points below 100° C. but when such polyhydric alcohols are used the process does not show any advantage over those of the prior art.

Amines having at least 3 active hydrogen atoms and no hydroxy groups in the molecule are ethylene diamine, diethylene triamine, triethylene tetramine, hexamethylene diamine and 1,2-diaminocyclohexane. The process is particularly useful when all of the amino groups are attached to aromatic rings. These include o,m- and p-phenylene diamines, the mixtures of amines obtained by reduction of the dinitration products of toluene, and p,p′-diaminodiphenylmethane.

The amount of hydroxyalkylamine to be used in admixture with the compound containing active hydrogen when it is a polyhydric alcohol should be sufficient to ensure that the reaction mixture is stirrable in the early stages of the reaction. Where the compound containing active hydrogen is an amine free from hydroxyl groups the amount of hydroxyalkylamine to be used should be sufficient to dissolve any catalyst used and to ensure the mixture is stirrable in the early stages of the reaction. The most suitable proportions to be used in any particular case depend upon the constitution of the particular compound having active hydrogen atoms and hydroxyalkylamine being used and may be found by trial. Generally, from 10% to 50% of hydroxyalkylamine based on the total weight of compounds containing active hydrogen atoms and hydroxyalkylamine is found to be a suitable range of proportions.

One method of preparing suitable mixtures when the compound containing active hydrogen atoms is a polyhydric alcohol is to mix the hydroxyalkylamine with an aqueous solution of the polyhydric alcohol and then to remove the water from the mixture by heating under reduced pressure before reaction with the alkylene oxide takes place. When the active hydrogen-containing compound is an amine it is advantageously mixed with the hydroxyalkylamine in the absence of water and heated under reduced pressure to remove adventitious water.

The general conditions of the reaction between the alkylene oxide and the mixture of the compound containing hydrogen atoms and hydroxyalkylamine may be as described in the prior art relating to the reaction of alkylene oxides with active hydrogen-containing compounds. Thus, temperatures of from 50° C. to 150° C., preferably 90° C. to 120° C., and pressures of up to 80 pounds per square inch may be employed. Basic catalysts, for example potassium hydroxide, may advantageously be used. The amount of alkylene oxide used in the reaction should be sufficient to form a polyether polyol composition having the desired average molecular weight and/or hydroxyl value.

After completion of the reaction, the polyether polyol may be freed from catalyst, if necessary, by conventional methods such as neutralisation with an acid or treatment with carbon or natural or synthetic absorbent earths or mixtures thereof followed by filtration. It is advantageous to incorporate an antioxidant in the polyether polyol at some stage during its manufacture or purification. Suitable antioxidants include sterically hindered phenols.

The polyether polyols produced by the process of the present invention are highly reactive towards isocyanates and are particularly useful in the manufacture of cellular or non-cellular polyurethane materials using, for example, the general methods described in the prior art. Thus the polyether polyols, optionally in admixture with other polyols, may be reacted with organic polyisocyanates in the presence, as necessary, of other materials such as gas generating agents, catalysts, surface active agents, flameproofing agents and other conventional additives.

Because of their high reactivity the polyether polyol prepared as described herein are particularly suitable for use in the manufacture of foamed polyurethanes using conventional techniques such as the one-shot and various prepolymer processes. The usual gas-generating agents, for example water and/or fluorinated hydrocarbons, may be employed. Those polyether polyols which have relatively high average molecular weights and low hydroxyl values may be used in the manufacture of flexible foams whilst the high hydroxyl value polyols may be used in the manufacture of rigid foams. The combination of high reactivity and high hydroxyl functionality found in the polyether polyols derived from sorbitol or sucrose makes them particularly suitable starting materials for rigid foam manufacture. The polyethers of the present invention have advantageously low viscosities compared with, for example, oxyalkylated sucroses of the same hydroxyl value.

The usual tolylene diisocyanates or diphenylmethane diisocyanates may be used in the polyurethane process but other organic polyisocyanates may be used if desired. Suitable catalysts include the usual tertiary amines and organic compounds of metals such as tin. In some cases, however, it may be found that the reactivity of the polyether polyols towards isocyanates is such that the use of catalysts of high activity is not necessary. Surface active agents which may be employed include siloxane- oxyalkylene copolymers, oxyethylated alkyl phenols, oxyethylated fatty alcohols and block copolymers of ethylene and propylene oxides.

The invention is illustrated but not limited by the following examples in which all parts are by weight:

Example 1

500 parts of a commercial triethanolamine, 1395 parts of a 67% solution of sucrose in water (containing 933 parts of sucrose) and 9.5 parts of potassium hydroxide are charged to a stainless steel reactor. Water is removed by heating to 100° C. under pressure of 15 mm. of mercury. 1952 parts of propylene oxide are added over 1½ hours using cooling water to control the exothermic reaction. After a further hour at 100° C. any residual propylene oxide is removed by applying a vacuum of 15 mm. of mercury. 8.7 parts of acetic acid are added and the mixture is heated to 100° C. for ½ hour followed by ½ hour under vacuum.

The product has an acid value of 0.21 mg. KOH/g., a hydroxyl value of 519 mg. KOH/g. and a viscosity of 395 stokes.

The following foams are prepared from the resin:

|  | 1 | 2 | 3 |
|---|---|---|---|
| Polyol prepared as above | 100 | 100 | 100 |
| Trichlorofluoromethane | 40 | 60 | 40 |
| Oxyalkylene/siloxane copolymer | 1.0 | 1.0 | 1.0 |
| Water | | | 2 |
| Diphenylmethane diisocyanate composition prepared by phosgenation of an aniline/formaldehyde condensate | 136 | 136 | 168 |
| Cream time (seconds) | 30 | 30 | 20 |
| Rise time (seconds) | 60 | 80 | 150 |
| Texture of foam | (1) | (2) | (3) |
| Density (g./cc.) | 0.050 | 0.034 | 0.030 |

1 Fine and even.
2 Somewhat coarser and even.
3 Fine and even, somewhat friable.

Example 2

To a 1 gallon pressure vessel as described in Example 1 are charged 806 parts of commercial triethanolamine, 459 parts of toluene diamine and 9.0 parts of potassium hydroxide in 9.0 parts of water, and the vessel sealed. The agitator is started, the temperature raised to 100° C. and the vessel evacuated to a pressure of 15 mm. Hg and maintained for 1 hour, after which the vessel is re-sealed. The vacuum is released by the addition of propylene oxide; further propylene oxide (2328 parts) is added over 2 hours, at pressures up to 30 p.s.i., the exothermic reaction being controlled at a temperature of 100–110° C. by means of cooling water. When the addition is complete, stirring is continued for 1 hour at 100–110° C., after which time the pressure is again reduced to 15 mm. Hg and maintained for 1 hour to remove any unreacted propylene oxide. The product is discharged and the catalyst neutralised by stirring for ½ hour at 100° C. with 10.2 parts of glacial acetic acid. The neutralised product (3430 parts) has an acid value of 0.67 mg. KOH/g.; hydroxyl value of 508.8 mg. KOH/g. and a viscosity of 29.5 stokes at 25° C, and may be converted into a rigid polyurethane foam in a manner similar to that described in Example 1.

Example 3

To a 1 gallon pressure vessel as described in Example 1 are charged 806 parts of commercial triethanolamine, 771 parts of diaminodiphenylmethane and 9.0 parts of potassium hydroxide in 9.0 parts of water, and the vessel sealed. The agitator is started, the temperature raised to 100° C. and the vessel evacuated to a pressure of 15 mm. Hg and maintained for 1 hour, after which the vessel is re-sealed. The vacuum is released by adding propylene oxide; further propylene oxide (2046 parts) is added over 1½ hours at pressures up to 30 p.s.i., the exothermic reaction being controlled at a temperature of 100–110° C. by means of cooling water. When the addition is complete, stirring is continued for 1 hour at 100–110° C., after which time the pressure is again reduced to 15 mm. Hg and maintained for 1 hour to remove any unreacted propylene oxide.

The product is discharged and the catalyst is neutralised by stirring for ½ hour at 100° C. with 10.2 parts of glacial acetic acid. The neutralised product (3515 parts) has an acid value of 0.8 mg. KOH/g.; hydroxyl value of 487.4 mg. KOH/g. and a viscosity of 114.4 stokes at 25° C, and may be converted into a rigid polyurethane foam in a manner similar to that described in Example 1

We claim:
1. A process for the manufacture of a polyether polyol which comprises reacting an alkylene oxide with a mixture of a compound containing active hydroegn atoms selected from (1) a polyhydric alcohol having a melting point in excess of 100° C., (2) an amine having at least two amino groups and at least three active hydrogen atoms in the molecule, the amino groups being the sole active hydrogen-containing groups and (3) mixtures thereof and a hydroxyalkylamine that is liquid at 100° C. and contains at least two active hydrogen atoms in the molecule, at a temperature ranging from 50° C. to 150° C. and at a pressure up to 80 pounds per square inch.

2. A process as claimed in claim 1 wherein the hydroxyalkylamine contains at least three active hydrogen atoms in the molecule.

3. A process as claimed in claim 2 where the hydroxyalkylamine is triethanolamine.

4. A process as claimed in claim 1 wherein the polyhydric alcohol contains at least six active hydrogen atoms in the molecule.

5. A process as claimed in claim 1 wherein there is used from 10% to 50% of hydroxyalkylamine based on the total weight of compound containing active hydrogen atoms and hydroxyalkylamine.

References Cited

UNITED STATES PATENTS 2,871,266   1/1959   Riley.

CHARLES B. PARKER, *Primary Examiner.*

R. L. RAYMOND, *Assistant Examiner.*

U.S. Cl. X.R.

260—77.5